Patented May 31, 1949

2,471,628

UNITED STATES PATENT OFFICE 2,471,628

MONOAZO PYRAZOLONE DYES

Oscar Knecht and Theodor Wirth, Basel, Switzerland, assignors to Sandoz Limited, Fribourg, Switzerland, a firm of Switzerland No Drawing. Application July 26, 1945, Serial No. 607,258. In Switzerland August 31, 1944

4 Claims. (Cl. 260—163)

1

The present invention relates to new yellow wool dyestuffs which are fast to milling and to a process for their preparation.

It has been found that valuable yellow wool dyestuffs can be prepared by coupling diazo compounds prepared from aminobenzene sulphonic acid acylamides of the general formula

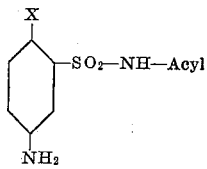

wherein X stands for hydrogen, alkyl or alkoxy group and Acyl stands for a radical of a saturated, unsaturated or hydroxylated aliphatic fatty acid with at least 11 carbon atoms, with arylpyrazolone sulphonic acids.

Aminobenzene sulphonic acid amides of the above formula, in which one hydrogen atom of the sulphamido group is substituted by a high molecular fatty acid radical have heretofore never been described and never been used for the manufacture of azo dyestuffs. As has been found, the new azo dyestuffs prepared in the above-described manner dye wool from an acid bath in pure yellow shades possessing excellent fastness to milling, perspiration, alkali and to light. It could not have been expected that the dyestuffs containing such a high aliphatic carbon chain would be sufficiently soluble in water, as is the case with the new dyestuffs.

As compared to the known pyrazolone dyestuffs described in U. S. Patent No. 1,876,884 prepared from diazotized aminobenzene sulphonic acid amides, in which one hydrogen atom of the sulphamide group is replaced by an aryl radical, the new dyestuffs possess a better fastness to washing, alkali and to light. When compared with the dyestuffs described in U. S. Patent No. 2,353,569 in which one hydrogen atom of the sulphamide group is replaced by an acetyl radical and which possess good fastness to light and an excellent levelling power as well as good fastness to alkali, the new dyestuffs are differentiated by an excellent fastness to milling and to perspiration.

The following examples, without being limitative, illustrate the present invention, the parts being by weight:

Example 1

43.8 parts of metanilic acid octadecanoylamide, prepared for instance by treating 1-nitrobenzene-3-sulphonic acid amide with stearoylchloride and by subsequent reduction, are dissolved in glacial acetic acid and diazotized by addition of 25 parts of 30% hydrochloric acid and 7 parts of sodium nitrite. The solution of the diazo compound is introduced slowly into an aqueous solution of 32.3 parts of 1-(2',5'-dichloro-4'-sulphophenyl)-3-methyl-5-pyrazolone, containing a sufficient amount of sodium carbonate for neutralizing the acid. The coupling takes place very rapidly at room temperature. The dyestuff that precipitates is filtered, washed with a dilute solution of sodium chloride and dried. In the dry state it is a yellow powder dyeing wool from an acid bath in clear greenish yellow shades possessing excellent fastness to milling, to perspiration and to light.

By using, instead of metanilic acid-octadecanoylamide, the respective hexadecanoylamide and the same coupling component, a dyestuff will be obtained which possesses similar properties.

Instead of using the pure metanilic acid acylamides it is also possible to use mixtures thereof. Such mixtures can for instance be obtained by treating 1-nitrobenzene-3-sulphonic acid amide with the acid chlorides prepared from technical stearine and subsequent reduction.

By coupling the above cited metanilic acid-octadecanoylamide or -hexadecanoylamide with 1-(2'-chloro-5'-sulphophenyl)-3-methyl-5-pyrazolone, a dyestuff will be obtained which dyes wool from an acid bath in pure yellow shades of excellent fastness properties.

Example 2

36.8 parts of 4-amino-1-methylbenzene-2-sulphonic acid decanoylamide are diazotized in the manner described in Example 1. By introducing the diazo solution into the aqueous solution of 28.8 parts of 1-(2'-chloro-5'-sulphophenyl)-3-methyl-5-pyrazolone, in presence of an excess of sodium carbonate, the coupling takes place immediately. When dried, the isolated dyestuff is a yellow powder, dyeing wool in pure greenish yellow shades possessing an excellent fastness to milling, perspiration, alkali and to light.

The preparation of the acylamide described above is carried out by treating 4-nitro-1-methylbenzene-2-sulphonic acid amide with lauric acid chloride and by subsequent reduction.

Example 3

46.8 parts of 4-amino-1-methoxybenzene-2-sulphonic acid octadecanoylamide are diazotized in glacial acetic acid by means of an addition of 25 parts of 30% hydrochloric acid and 7 parts of sodium nitrite. The yellowish diazo solution is allowed to flow into a solution containing 32.3 parts of 1-(2',5'-dichloro-4'-sulphophenyl)-3-methyl-5-pyrazolone and a certain amount of sodium acetate in 80% acetic acid. The dyestuff precipitates immediately in the form of a paste which is filtered and transformed into the sodium salt in the usual manner. The dyestuff dyes wool in pure yellow shades which are somewhat redder than those of the dyestuff of Example 1. The dyeings thus obtained are fast to milling, to perspiration, to alkali and to light.

*Example 4*

45.2 parts of 4-amino-1-methylbenzene-2-sulphonic acid octadecanoylamide are diazotized in the manner described in Example 1 and coupled in presence of sodium carbonate with 32.3 parts of 1-(2',5'-dichloro-4'-sulphophenyl)-3-methyl-5-pyrazolone. The dyestuff thus obtained dyes wool in greenish yellow shades possessing an excellent fastness to milling, to perspiration and to alkali as well as a very good fastness to light.

By using, instead of the above cited pyrazolone, 28.8 parts of 1-(4'-chloro-2'-sulphophenyl)-3-methyl-5-pyrazolone, a similar dyestuff possessing the same fastness properties will be obtained.

By using as coupling component an equivalent quantity of 1-(4'-sulphophenyl)-3-methyl-5-pyrazolone a dyestuff will be obtained that dyes wool in reddish-yellow shades. The dyeings thus obtained are very fast to milling, to perspiration, to alkali and to light.

*Example 5*

43.6 parts of metanilic acid octadecanoylamide are dissolved in glacial acetic acid and diazotized with 25 parts of 30% hydrochloric acid and 7 parts of sodium nitrite. The diazo solution is allowed to flow into a solution of 32.3 parts of 1-(2',5'-dichloro-4'-sulphophenyl)-3-methyl-5-pyrazolone containing a certain amount of potassium acetate in glacial acetic acid. The dyestuff precipitates in an oily resinous form. By addition of water the precipitation is increased. The dyestuff is separated from the mother lye, dissolved in water under addition of sodium carbonate until alkaline reaction, and precipitated with sodium chloride in form of its sodium salt. After washing with sodium chloride solution and drying an easily soluble yellow powder will be obtained. It dyes wool in identical shades and with the same fastness properties as the dyestuff described in Example 1.

*Example 6*

438 parts of finely powdered metanilic acid octadecanoylamide are suspended in 2000 parts of aqueous 15% hydrochloric acid; to this suspension are slowly added at 10° C., while stirring, 69 parts of sodium nitrite in form of a concentrated aqueous solution and in such a manner that the same flows into the suspension under the surface of the liquid. The suspension of the diazo compound thus obtained is added slowly to a solution of 323 parts of 1-(2',5'-dichloro-4'-sulphophenyl)-3-methyl-5-pyrazolone in 700 parts of water and 800 parts of ice in presence of 80 parts of sodium hydroxide. Simultaneously with the flowing in of the suspension of the diazo compound a concentrated caustic soda lye is added to the reaction mixture in the manner that, till the end of the coupling, the reaction mixture remains always alkaline when tested with phenolphthalein paper. After the coupling is finished, the dyestuff is precipitated by addition of acetic acid until the reaction mixture shows a very slight alkaline reaction. The dyestuff thus precipitated is filtered and dried. It is identical with the dyestuff obtained according to Example 1.

What we claim is:

1. A monoazo dyestuff of the formula

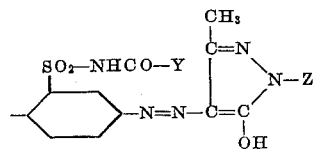

wherein Y stands for a member selected from the group consisting of the $C_{15}H_{31}$ and $C_{17}H_{35}$ radicals, and —Z represents a member selected from the group consisting of

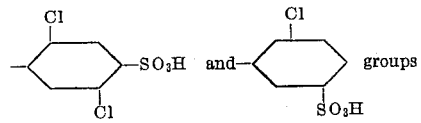

2. The monoazo dyestuff of the formula

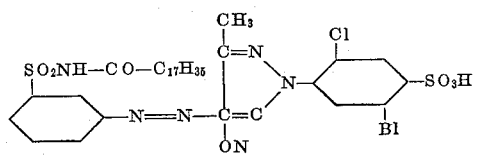

3. The monoazo dyestuff of the formula

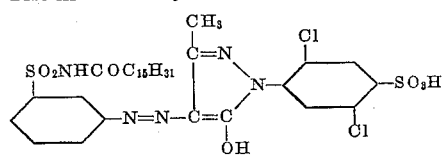

4. The monoazo dyestuff of the formula

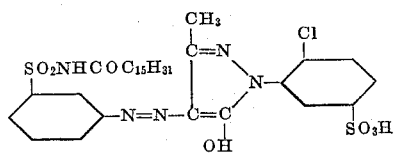

OSCAR KNECHT.
THEODOR WIRTH.

REFERENCES CITED

The following references are of record in the file of this patent:

UNITED STATES PATENTS

| Number | Name | Date |
| --- | --- | --- |
| 1,876,884 | Eichwede | Sept. 13, 1932 |
| 1,929,853 | Reindel | Oct. 10, 1933 |
| 2,155,493 | Knight | Apr. 25, 1939 |
| 2,200,423 | Krebser | May 14, 1940 |
| 2,353,569 | Knecht | July 11, 1944 |

FOREIGN PATENTS

| Number | Country | Date |
| --- | --- | --- |
| 394,343 | Great Britain | June 12, 1933 |
| 184,012 | Switzerland | Sept. 1, 1936 |

Certificate of Correction

Patent No. 2,471,628 — May 31, 1949

OSCAR KNECHT ET AL.

It is hereby certified that errors appear in the printed specification of the above numbered patent requiring correction as follows:

Column 4, lines 23 to 27, inclusive, for that portion of the formula reading

lines 31 to 36, inclusive, in the formula, for

lines 50 to 52, inclusive, for

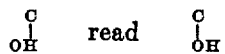

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*